US011665070B2

(12) United States Patent
Ju

(10) Patent No.: US 11,665,070 B2
(45) Date of Patent: May 30, 2023

(54) DATA TRANSMISSION METHOD AND RELATED APPARATUS

(71) Applicant: HUAWEI TECHNOLOGIES CO., LTD., Guangdong (CN)

(72) Inventor: Wenbin Ju, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 259 days.

(21) Appl. No.: 17/033,188

(22) Filed: Sep. 25, 2020

(65) Prior Publication Data
US 2021/0014138 A1 Jan. 14, 2021

Related U.S. Application Data

(63) Continuation of application No. PCT/CN2019/076606, filed on Mar. 1, 2019.

(30) Foreign Application Priority Data

Mar. 29, 2018 (CN) .......................... 201810274242.8

(51) Int. Cl.
H04L 43/04 (2022.01)
H04L 47/80 (2022.01)

(52) U.S. Cl.
CPC ............ H04L 43/04 (2013.01); H04L 47/805 (2013.01); H04L 2212/00 (2013.01)

(58) Field of Classification Search
CPC ..... H04L 43/04; H04L 67/141; H04L 47/805; H04L 61/00; H04L 2212/00;
(Continued)

(56) References Cited

U.S. PATENT DOCUMENTS

2006/0026017 A1 2/2006 Walker
2014/0105031 A1* 4/2014 Mcdysan ............. H04L 45/302
370/242

(Continued)

FOREIGN PATENT DOCUMENTS

CN 1412988 A 4/2003
CN 103247157 A 8/2013
(Continued)

OTHER PUBLICATIONS

Kenji Nitta et al. "reduction process on distribution database", the 7th Forum on Data Engineering and Information Management, Japan, Institute of Electronics, Information and Communication Engineers Data Engineering Research Committee, Japan Database Society, Database System Study Group of Information Processing Society, Aug. 18, 2015.

(Continued)

Primary Examiner — Oussama Roudani
(74) Attorney, Agent, or Firm — Womble Bond Dickinson (US) LLP

(57) ABSTRACT

The application discloses a data transmission method and a related apparatus. A first device receives a connection establishment request and a target data feature that are sent from an analysis device. The connection establishment request includes a first connection parameter of the analysis device. The first device determines, based on the target data feature, a second device that collects data corresponding to the target data feature. The first device and the second device belong to a same distributed system. The first device determines a second connection parameter of the second device; and sends the first connection parameter, the second connection parameter and the target data feature to the second device. The second device establishes a connection to the analysis device based on the first connection parameter and the second connection parameter, and transmits the data corre- (Continued)

sponding to the target data feature to the analysis device through the established connection.

18 Claims, 4 Drawing Sheets

(58) Field of Classification Search
CPC ............ H04L 67/1004; H04L 67/1001; H04L 12/4633; H04L 67/1014; H04L 61/2521; H04L 67/1017
See application file for complete search history.

(56) References Cited

U.S. PATENT DOCUMENTS

| | | |
|---|---|---|
| 2014/0105039 A1 | 4/2014 | Mcdysan |
| 2014/0105062 A1* | 4/2014 | Mcdysan ............... H04L 45/306 370/254 |
| 2014/0258509 A1 | 9/2014 | Raghuraman et al. |
| 2015/0052214 A1 | 2/2015 | Zhao et al. |
| 2015/0103838 A1* | 4/2015 | Zhang ................... H04L 12/467 370/401 |
| 2015/0106420 A1 | 4/2015 | Warfield et al. |
| 2015/0201447 A1 | 7/2015 | Li et al. |
| 2018/0159748 A1* | 6/2018 | Kirner ................. H04L 41/5058 |
| 2018/0167316 A1* | 6/2018 | Agarwal ............... H04L 45/586 |
| 2018/0176307 A1* | 6/2018 | Kancherla ............. H04L 67/141 |
| 2019/0109899 A1* | 4/2019 | Newton ................ H04L 67/148 |
| 2020/0389403 A1* | 12/2020 | Buddhikot .......... H04L 67/1001 |

FOREIGN PATENT DOCUMENTS

| | | |
|---|---|---|
| CN | 103702364 A | 4/2014 |
| CN | 104967656 A | 10/2015 |
| CN | 105226959 A | 1/2016 |
| CN | 107623631 A | 1/2018 |
| CN | 109194617 A | 1/2019 |
| JP | 2004348176 A | 12/2004 |
| JP | 2006277570 A | 10/2006 |
| JP | 2008085819 A | 4/2008 |
| WO | 2015173957 A1 | 11/2015 |

OTHER PUBLICATIONS

Paola Bresesti et al.,"HVDC Connection of Offshore Wind Farms to the Transmission System",IEEE Transactions on Energy Conversion, vol. 22, No. 1, Mar. 2007,total 7 pages.

* cited by examiner

DATA TRANSMISSION METHOD AND RELATED APPARATUS

CROSS-REFERENCE TO RELATED APPLICATIONS

This application is a continuation of International Application No. PCT/CN2019/076606, filed on Mar. 1, 2019, which claims priority to Chinese Patent Application No. 201810274242.8, filed on Mar. 29, 2018. The disclosures of the aforementioned applications are hereby incorporated by reference in their entireties.

TECHNICAL FIELD

The application relates to the field of communications technologies, and in particular, to a data transmission method and a related apparatus.

BACKGROUND

To ensure quality of service for a service in a network, regardless of a wired network or a wireless network, network measurement usually needs to be performed. The network measurement is usually performed by an analysis device. A communications connection is established between a network device and the analysis device, for example, a Transmission Control Protocol (TCP) connection. The network device, according to a requirement of the analysis device, collects data used for the network measurement, and transmits the collected data to the analysis device through the communications connection. The analysis device determines states of the network device, such as a network latency, jitter, congestion, and a packet loss, by analyzing the data collected by the network device. A network administrator or a network management server, based on a network measurement result, may discover a problem in the network in a timely manner, and adjust a network configuration parameter, thereby ensuring the quality of service for the service in the network.

A network device with a distributed architecture, for example, a modular configuration switch, usually includes a main control board and a plurality of interface boards. During the network measurement, the analysis device establishes the TCP connection to the main control board. Each of the plurality of interface boards collects the data required for the network measurement, and sends the collected data to the main control board. After encapsulating the data collected by each interface board, the main control board sends the encapsulated data to the analysis device. In this way, the data collected by each interface board needs to be transmitted through the TCP connection between the main control board and the analysis device. When there are a relatively large quantity of interface boards, each interface board sends a large amount of collected data to the main control board, and the data is beyond a bearer capability of the TCP connection between the main control board and the analysis device. Consequently, the collected data cannot be sent to the analysis device in a timely manner, and the network measurement result obtained by the analysis device is not timely and accurate.

SUMMARY

The application provides a data transmission method and a related apparatus, to avoid a problem that data collected by an interface board is aggregated in bulk to a main control board, and consequently, the data cannot be sent to an analysis device in a timely manner, and a network measurement result obtained by the analysis device is not timely and accurate.

In an embodiment, the application provides a data transmission method. A first device receives a connection establishment request and a target data feature that are sent from an analysis device, where the connection establishment request includes a first connection parameter of the analysis device. The first device determines, based on the target data feature, a second device that collects to-be-analyzed data corresponding to the target data feature, where the first device and the second device belong to a same distributed system. The first device determines a second connection parameter of the second device. The first device sends the first connection parameter, the second connection parameter, and the target data feature to the second device, so that the second device establishes a connection to the analysis device based on the first connection parameter and the second connection parameter, and transmits the to-be-analyzed data corresponding to the target data feature to the analysis device through the established connection.

In an embodiment of the application, the second device does not need to aggregate the collected to-be-analyzed data to the first device, but directly transmits the collected to-be-analyzed data to the analysis device. Therefore, even if a plurality of second devices simultaneously collect the to-be-analyzed data, each of the plurality of second devices may transmit respective collected to-be-analyzed data to the analysis device without causing a large amount of data to be aggregated to the first device, to prevent the first device from becoming a bottleneck during data transmission, and to further avoid a problem that the to-be-analyzed data cannot be sent to the analysis device in a timely manner, and an analysis result obtained by the analysis device is not timely and accurate.

In an embodiment the first device determines a second connection parameter of the second device when the first device determines, based on the target data feature, that the to-be-analyzed data is data that identifies at least one second device feature in the distributed system, or when collection frequency of the to-be-analyzed data is greater than a frequency threshold, determining, by the first device, the second connection parameter of the second device.

In an embodiment, when the first device analyzes the target data feature, and determines that the to-be-analyzed data is the data identifies the at least one second device feature in the distributed system, or when the collection frequency of the to-be-analyzed data is greater than the frequency threshold, it indicates that there is a relatively large amount of the to-be-analyzed data collected by the second device, and a performance requirement for the first device to output data is relatively high. In this case, the first device determines the second connection parameter of the second device, so that the second device directly establishes the connection to the analysis device, and transmits the collected to-be-analyzed data, to prevent the first device from becoming the bottleneck during the data transmission, and to further avoid the problem that the to-be-analyzed data cannot be sent to the analysis device in a timely manner, and the analysis result obtained by the analysis device is not timely and accurate.

In an embodiment, the first device sends a mapping relationship between the second connection parameter of the second device and an interface corresponding to the second device to the analysis device, where the interface corresponding to the second device is an interface used by the second device to collect the to-be-analyzed data.

In an embodiment, the first device receives a packet sent from the second device, where the packet is obtained by encapsulating the to-be-analyzed data based on the first connection parameter and the second connection parameter by the second device; and the first device forwards the packet to the analysis device based on the first connection parameter.

In an embodiment, the second connection parameter includes an address of the second device, where the address of the second device is different from an address of the first device; the second connection parameter includes an address of the second device and a port number of the second device, where the address of the second device is different from an address of the first device; or the second connection parameter includes an address of the first device and a port number of the second device, where the port number of the second device is allocated for the first device.

In an embodiment, the application provides a data transmission method. A second device receives a first connection parameter, a second connection parameter, and a target data feature that are sent from the first device, where the first connection parameter and the target data feature are sent from an analysis device to the first device, the second connection parameter is determined by the first device, and the first device and the second device belong to a same distributed system. The second device establishes a connection to the analysis device by using the first connection parameter and the second connection parameter. The second device collects to-be-analyzed data corresponding to the target data feature. The second device sends the to-be-analyzed data to the analysis device through the established connection.

In an embodiment of the application, the second device does not need to aggregate the collected to-be-analyzed data to the first device, but directly transmits the collected to-be-analyzed data to the analysis device. Therefore, even if a plurality of second devices simultaneously collect the to-be-analyzed data, each of the plurality of second devices may transmit respective collected to-be-analyzed data to the analysis device without causing a large amount of data to be aggregated to the first device, to prevent the first device from becoming a bottleneck during data transmission, and to further avoid a problem that the to-be-analyzed data cannot be sent to the analysis device in a timely manner, and an analysis result obtained by the analysis device is not timely and accurate.

In an embodiment, the second device encapsulates the to-be-analyzed data into a packet based on the first connection parameter and the second connection parameter; and the second device sends the encapsulated packet to the analysis device through the established connection.

In an embodiment, the second device sends the encapsulated packet to the first device, so that the first device forwards the encapsulated packet to the analysis device.

In an embodiment, the second connection parameter includes an address of the second device, where the address of the second device is different from an address of the first device; the second connection parameter includes an address of the second device and a port number of the second device, where the address of the second device is different from an address of the first device; or the second connection parameter includes an address of the first device and a port number of the second device, where the port number of the second device is allocated for the first device.

In an embodiment, the application provides a data transmission apparatus, including a function unit configured to perform methods as described herein.

In an embodiment, the application provides a data transmission system, including the data transmission apparatus as described herein.

In an embodiment, the application provides a data transmission device, including a processor and a memory, where the memory is configured to store computer program code, and the computer program code includes an instruction; and the processor is configured to execute the instruction, to enable the data transmission device to provide the data transmission methods as described herein.

In an embodiment, the application provides a computer-readable storage medium. The computer-readable storage medium stores instructions that when executed by a processor cause the processor to perform the data transmission methods as described herein.

BRIEF DESCRIPTION OF DRAWINGS

To describe the technical solutions in embodiments of the application more clearly, the following briefly describes the accompanying drawings that need to be used in the embodiments of the application.

DESCRIPTION OF EMBODIMENTS

When no conflict occurs, various embodiments in the application and different features in the various embodiments may be combined with each other.

Figure 1:
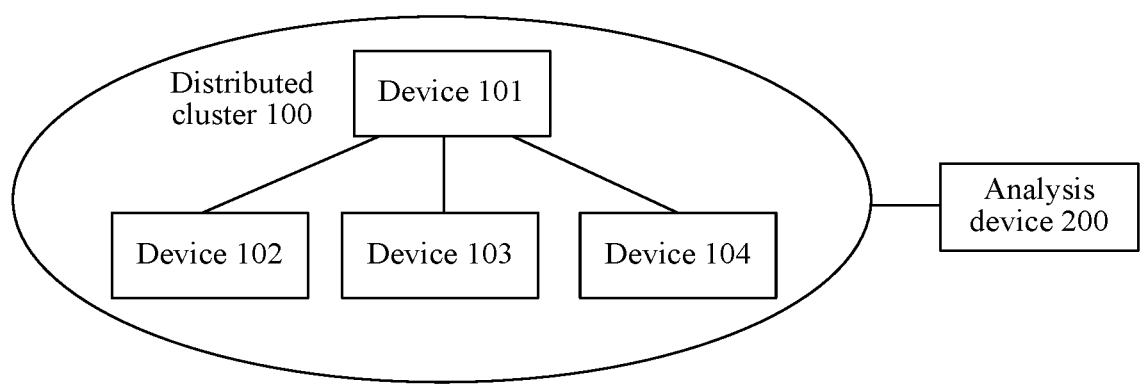
FIG. 1 is a schematic diagram of a network architecture according to an embodiment of the application.

The embodiments of the application may be applied to a distributed system. FIG. 1 is a schematic diagram of a network architecture according to an embodiment of the application. As shown in FIG. 1, a distributed system is a distributed cluster 100. The distributed cluster 100 may be a cluster in a wireless network, or may be a network device with a distributed architecture, for example, a modular configuration switch or a modular configuration router. The distributed cluster 100 includes a plurality of devices, and an example in which a device 101, a device 102, a device 103, and a device 104 are included is used for description in FIG. 1. In the distributed cluster 100, each of the device 102, the device 103, and the device 104 can communicate with the device 101. The device 101 serves as an external interface or a proxy of the cluster, and is used for data transmission between each device in the distributed cluster 100 and another device out of the distributed cluster 100. The device 101 further coordinates cooperation between various devices in the distributed cluster 100. An analysis device 200 is a device that performs network measurement on the distributed cluster 100, the device in the distributed cluster 100, or a network at which the distributed cluster 100 is located. The analysis device 200 and the distributed cluster 100 may be located at a same network, or the analysis device

200 and the distributed cluster 100 may be located at different networks. When performing the network measurement on the distributed cluster 100, the device in the distributed cluster 100, or the network at which the distributed cluster 100 is located, the analysis device 200 needs to first establish a connection to the distributed cluster 100, and then notify the device in the distributed cluster 100 of a feature of to-be-analyzed data. After collecting data, the device in the distributed cluster 100 encapsulates the collected data, and then transmits the encapsulated data to the analysis device 200 through the established connection. The analysis device 200 obtains and analyzes the collected data, and adjusts a network configuration parameter based on an analysis result, to ensure quality of service for a service in a network.

Currently, in the distributed cluster 100, each device transmits data to a device out of the cluster through the device 101. Therefore, during the network measurement, the analysis device 200 first establishes a connection to the device 101, and then notifies the device 101 of the data feature of the to-be-analyzed data. The device 101 may determine, by using the data feature of the to-be-analyzed data, the to-be-analyzed data that is to be collected and a device that collects the to-be-analyzed data, and deliver, to the determined device that collects the to-be-analyzed data, the data feature of the to-be-analyzed data that is to be collected, for example, the device 102, the device 103, and the device 104. After collecting the to-be-analyzed data, the device 102, the device 103, and the device 104 send the collected to-be-analyzed data to the device 101. After aggregating the to-be-analyzed data that is collected by other devices, the device 101 encapsulates the to-be-analyzed data, and sends the encapsulated to-be-analyzed data to the analysis device 200. The analysis device 200 performs the network measurement based on the received to-be-analyzed data. When collection frequency of the to-be-analyzed data is greater than a threshold, the to-be-analyzed data identifies an entire distributed system feature, or the like, the device 102, the device 103 and the device 104 collect a large amount of to-be-analyzed data, and send the collected to-be-analyzed data to the device 101. If data output performance of the device 101 cannot meet a requirement, for example, when an amount of the collected data goes beyond a bearer capability of the connection between the device 101 and the analysis device 200, consequently, the to-be-analyzed data received by the device 101 cannot be sent to the analysis device 200 in a timely manner. Therefore, in a scenario in which the requirement for the data output performance is high, the device 101 is a bottleneck during data transmission to the analysis device.

In an embodiment of the application, the analysis device 200 may establish a connection to another device in the distributed cluster 100 through the device 101, e.g., the analysis device 200 may establish a connection to each device that collects data, and perform data transmission, to avoid a case in which data collected by a plurality of devices is aggregated to one device and then transmitted, so that the data collected by each device can be transmitted to the analysis device 200 in a timely manner. Further, the analysis device 200 may obtain the analysis result accurately and in a timely manner, to achieve an objective of optimizing the network configuration parameter.

For example, the distributed system may further be a modular configuration switch. The modular configuration switch includes a main control board and a plurality of interface boards, and the main control board and the interface boards may transmit data through an Ethernet interface. In the distributed system shown in FIG. 1, the device 101 is equivalent to the main control board, and the device 102, the device 103, and the device 104 are equivalent to the interface boards. In an embodiment of the application, the analysis device may separately establish a connection to each interface board through the main control board, so that data collected by each interface board is transmitted through the established connection.

Figure 2:
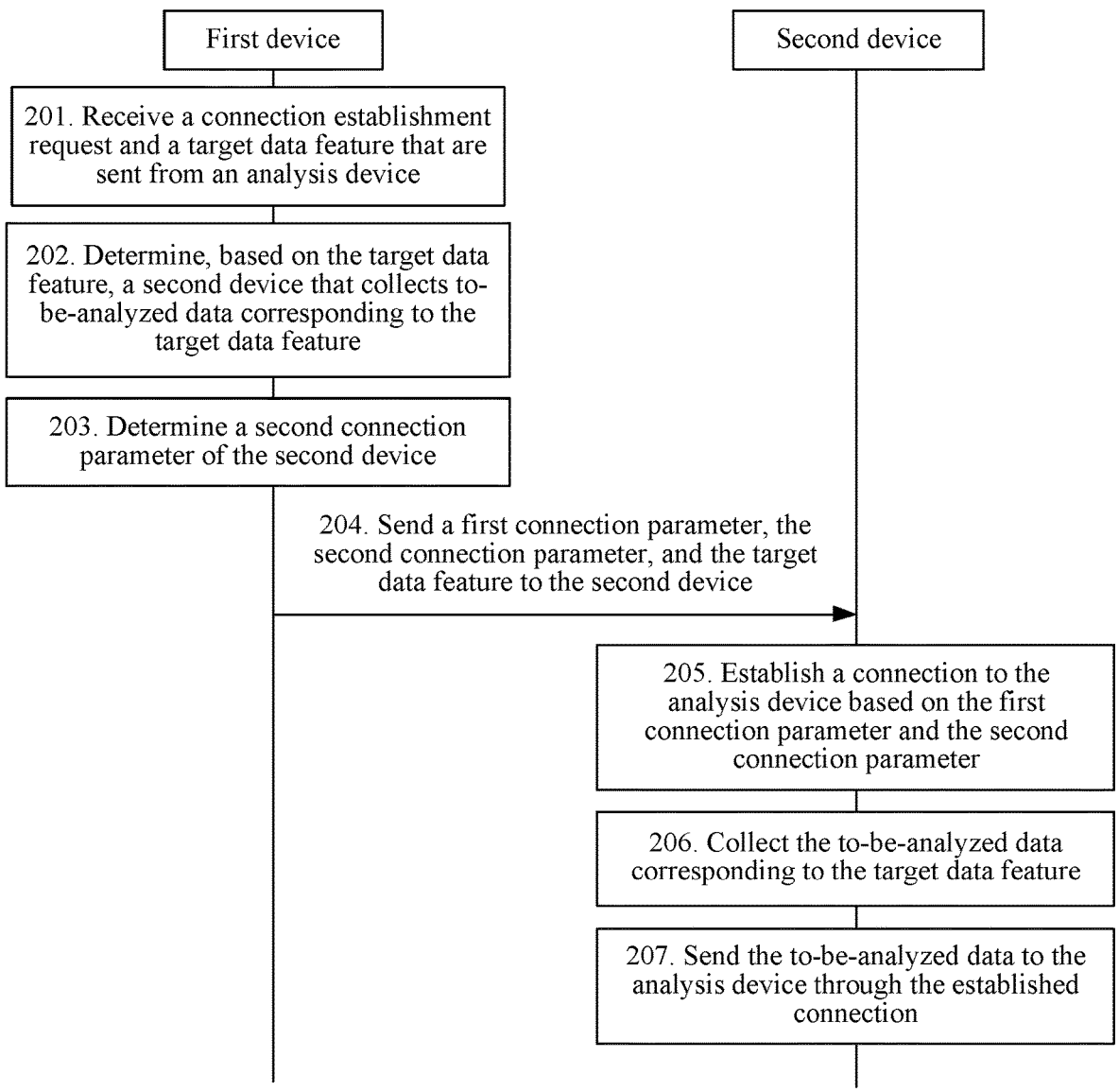
FIG. 2 is a schematic flowchart of a data transmission method according to an embodiment of the application.

An embodiment of the application provides a data transmission method, which may be applicable to the network architecture shown in FIG. 1. As shown in FIG. 2, the method includes the following operations.

201. A first device receives a connection establishment request and a target data feature that are sent from an analysis device.

The connection establishment request is used to request to establish a connection to a distributed system. The connection establishment request includes a first connection parameter of the analysis device. The first connection parameter may include an address, a port number, a protocol type of the to-be-established connection, and the like of the analysis device. For example, if the connection established by the analysis device is a TCP connection, the first connection parameter may include an IP address of the analysis device, a protocol type of the connection, e.g., a TCP, a TCP port number of the analysis device, and the like.

The first device is a device in the distributed system that performs data transmission with a device out of the distributed system, and may be the device 101 in the distributed system shown in FIG. 1. The target data feature is used to indicate target data. The target data is to-be-analyzed data, e.g., data that needs to be analyzed when the analysis device performs network measurement. The target data feature may include a type, collection frequency, a collection period, and the like of the target data.

In an embodiment of the application, when performing the network measurement on the distributed system, the analysis device may establish a connection to a device that collects the target data. When establishing the connection, the analysis device first sends, to the first device, the connection establishment request used to establish the connection. After receiving the connection establishment request sent from the analysis device, the first device determines that the analysis device establishes the connection to perform the network measurement.

For example, when the distributed system is a modular configuration switch, the analysis device needs to send the connection establishment request to a main control board. After receiving the connection establishment request, the main control board may determine the first connection parameter of the analysis device.

202. The first device determines, based on the target data feature, a second device that collects to-be-analyzed data corresponding to the target data feature.

The second device is a device that collects data required by the analysis device (e.g., the target data). The first device and the second device belong to the same distributed system. The second device may be the device 102, the device 103, or the device 104 in the distributed system shown in FIG. 1.

The first device may determine, based on the target data feature, target data that needs to be collected, e.g., the to-be-analyzed data, and second devices or interfaces that can collect the to-be-analyzed data, and may determine the second device that collects the to-be-analyzed data.

For example, if the analysis device needs to analyze a latency of forwarding traffic of a user A in the distributed system, the analysis device determines that a data feature of the to-be-analyzed data is times at which the traffic of the user A enters and leaves the distributed system, and the first device may determine that a device that forwards the traffic of the user A is the second device that can collect the data.

It should be noted that there may be one or more second devices that are determined by the first device and that collect the to-be-analyzed data.

203. The first device determines a second connection parameter of the second device.

After receiving the connection establishment request of the analysis device, the first device needs to determine the second connection parameter corresponding to the second device, so that a connection is established and data is transmitted between the second device and the analysis device.

When an address of the first device is different from an address of the second device, the second connection parameter may include the address of the second device (for example, an IP address), or the second connection parameter may include the address and a port number of the second device. For example, in the architecture shown in FIG. 1, the second device may have an independent IP address and port number, for example, a port number of the TCP connection or a port number of a User Datagram Protocol (UDP) connection. Therefore, the first device may determine the connection parameter used by the second device to establish the connection to the analysis device.

Alternatively, when an address of the first device is the same as an address of the second device, the second connection parameter includes the address of the first device and a port number of the second device. For example, the distributed system is the modular configuration switch, and each of IP addresses of an interface board and the main control board is an IP address of the switch. Therefore, the first device may determine that the address of the second device is the address of the first device, and the first device may allocate a port number for each second device to transmit data, and further determine a second connection parameter of each second device.

204. The first device sends the first connection parameter, the second connection parameter, and the target data feature to the second device.

The first device may send the first connection parameter, the second connection parameter, and the target data feature to the second device by using a message, or may separately send the first connection parameter, the second connection parameter, and the target data feature to the second device by using different messages.

205. The second device establishes a connection to the analysis device based on the first connection parameter and the second connection parameter.

After receiving the first connection parameter and the second connection parameter, the second device may establish, to the analysis device, the connection used to transmit data, and the connection, for example, may be the TCP connection.

206. The second device collects the to-be-analyzed data corresponding to the target data feature.

207. The second device sends the to-be-analyzed data to the analysis device through the established connection.

In an embodiment of the application, after receiving the connection establishment request sent from the analysis device, the first device may determine, based on the target data feature sent from the analysis device, the second device that collects the to-be-analyzed data, and the second connection parameter that may be used by the second device to establish the connection, and then send the first connection parameter and the target data feature of the analysis device, and the second connection parameter of the second device to the second device, so that the second device may directly establish the connection to the analysis device, and transmit the collected to-be-analyzed data to the analysis device through the directly established connection. In this way, the second device does not need to aggregate the collected to-be-analyzed data to the first device, but directly transmits the collected to-be-analyzed data to the analysis device. Therefore, even if a plurality of second devices simultaneously collect the to-be-analyzed data, each of the plurality of second devices may transmit respective collected to-be-analyzed data to the analysis device without causing a large amount of data to be aggregated to the first device, to prevent the first device from becoming a bottleneck during data transmission, and to further avoid a problem that the to-be-analyzed data cannot be sent to the analysis device in a timely manner, and an analysis result obtained by the analysis device is not timely and accurate.

In an embodiment of the application, after operation 206, when sending the to-be-analyzed data to the analysis device, the second device may further encapsulate the collected to-be-analyzed data based on the first connection parameter and the second connection parameter, and send the encapsulated to-be-analyzed data to the first device. The first device forwards the encapsulated to-be-analyzed data to the analysis device.

For example, when the to-be-analyzed data required by the analysis device is data that identifies a distributed system feature, the plurality of second devices are usually used to collect the to-be-analyzed data. In this case, after being separately encapsulated, the to-be-analyzed data collected by all second devices may be aggregated to the first device. The first device transmits the aggregated to-be-analyzed data encapsulated by all the second devices to the analysis device, so that the analysis device can obtain complete data. Especially in the distributed system such as the modular configuration switch, the interface board is not an independent device. When the to-be-analyzed data required by the analysis device is the data that identifies the distributed system feature, data collected by all interface boards usually is aggregated to the main control board, and the main control board sends the aggregated collected data to the analysis device.

In addition, the first device may further determine collection frequency of the to-be-analyzed data based on the target data feature. If the collection frequency is not high (for example, on the order of seconds), in this case, a performance requirement for the first device to output data is relatively low, and the collected to-be-analyzed data does not wait at the first device or waits for a very short time. The first device may transmit the collected to-be-analyzed data to the analysis device without affecting the network measurement performed by the analysis device. Therefore, in an embodiment of the application, after receiving the target data feature sent from the analysis device, the first device may further determine, based on the target data feature, to select a manner in which the to-be-analyzed data is transmitted to the analysis device, thereby determining whether to perform operation 203.

Therefore, in an embodiment of the application, operation 203 may further be performed, e.g., when the first device determines, based on the target data feature, that the to-be-analyzed data is the data that identifies at least one device feature in the distributed system, or when the collection frequency of the to-be-analyzed data is greater than a frequency threshold, the first device determines the second connection parameter corresponding to the second device.

Data related to at least one device in the distributed system may include data related to boards, ports, queues, and the like of one or more second devices. The frequency threshold may be set based on a requirement of an actual scenario. For example, frequency on the order of milliseconds may be set.

In an embodiment of the application, after the second device establishes the connection to the analysis device through the first device, the second device may collect the to-be-analyzed data based on a requirement of the analysis device, after the to-be-analyzed data is collected, encapsulate the collected to-be-analyzed data based on the first connection parameter and the second connection parameter, and send the encapsulated to-be-analyzed data to the analysis device. Therefore, operation 207 may be performed, e.g., the second device encapsulates the to-be-analyzed data into a packet based on the first connection parameter and the second connection parameter, and then sends the encapsulated packet to the analysis device through the established connection.

Each second device may collect different to-be-analyzed data based on requirements of the analysis device. After collecting the to-be-analyzed data, each second device may directly encapsulate the collected to-be-analyzed data into a packet, and send the encapsulated packet to the analysis device. It is not required that after being aggregated to the first device, the collected data is encapsulated by the first device.

When the second device sends the encapsulated packet to the analysis device, the second device may directly send the packet to the analysis device, or may send the encapsulated packet to the analysis device through the first device. If the second device sends the encapsulated packet to the analysis device through the first device, after receiving the packet sent from the second device, the first device may forward, based on an address carried by the packet, the packet to the analysis device without a need to encapsulate the packet again.

In another embodiment of the application, each second device collects the data on a corresponding interface, so that the first device may send a mapping relationship between the second connection parameter of each second device and each interface to the analysis device, and after receiving a packet sent from a different second device, the analysis device may determine, based on the mapping relationship, data on a specific interface of the received packet. Therefore, a network latency, jitter, congestion, a packet loss, and an emergency of each interface may be separately analyzed, or sample data on each interface may be aggregated, to obtain a performance profile of the entire device in a network. In this way, network traffic is adjusted based on a policy, each service is forwarded in an expected path, and quality of service for the service reaches an expected target. An interface corresponding to a second device is an interface used by the second device to collect the to-be-analyzed data.

Figure 3:
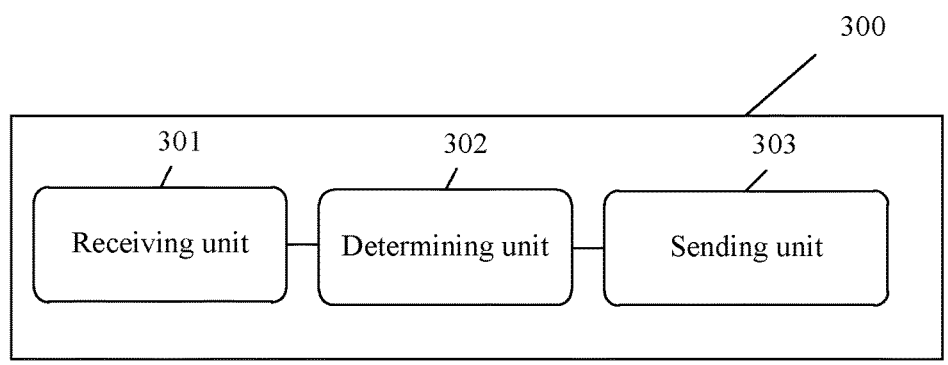
FIG. 3 is a schematic block diagram of a data transmission apparatus according to an embodiment of the invention.

FIG. 3 is a schematic block diagram of a data transmission apparatus 300 according to an embodiment of the application. The apparatus 300 is a first device in a distributed system, for example, a device 101. As shown in FIG. 3, the data transmission apparatus 300 includes:

a receiving unit 301, configured to receive a connection establishment request and a target data feature that are sent from an analysis device, where the connection establishment request includes a first connection parameter of the analysis device;

a determining unit 302, configured to determine, based on the target data feature, a second device that collects to-be-analyzed data corresponding to the target data feature, where the second device belongs to the distributed system;

the determining unit 302 is further configured to determine a second connection parameter of the second device; and a sending unit 303, configured to send the first connection parameter, the second connection parameter, and the target data feature to the second device, so that the second device establishes a connection to the analysis device based on the first connection parameter and the second connection parameter, and transmits the to-be-analyzed data corresponding to the target data feature to the analysis device through the established connection.

In an embodiment of the application, after receiving the connection establishment request sent from the analysis device, the apparatus 300 may determine, based on the target data feature sent from the analysis device, the second device that collects the to-be-analyzed data, and the second connection parameter that may be used by the second device to establish the connection, and then send the first connection parameter and the target data feature of the analysis device, and the second connection parameter of the second device to the second device, so that the second device may directly establish the connection to the analysis device, and transmit the collected to-be-analyzed data to the analysis device through the directly established connection. In this way, the second device does not need to aggregate the collected to-be-analyzed data to the apparatus 300, but directly transmits the collected to-be-analyzed data to the analysis device. Therefore, even if a plurality of second devices simultaneously collect the to-be-analyzed data, each of the plurality of second devices may transmit respective collected to-be-analyzed data to the analysis device without causing a large amount of data to be aggregated to the apparatus 300, to prevent the apparatus 300 from becoming a bottleneck during data transmission, and to further avoid a problem that the to-be-analyzed data cannot be sent to the analysis device in a timely manner, and an analysis result obtained by the analysis device is not timely and accurate.

It may be understood that the determining unit 302 is configured to: when the first device determines, based on the target data feature, that the to-be-analyzed data is data that identifies at least one second device feature in the distributed system, or when collection frequency of the to-be-analyzed data is greater than a frequency threshold, determine the second connection parameter of the second device.

It may be understood that the sending unit 303 is further configured to send a mapping relationship between the second connection parameter of the second device and an interface corresponding to the second device to the analysis device, where the interface corresponding to the second device is an interface used by the second device to collect the to-be-analyzed data.

It may be understood that the second connection parameter includes an address of the second device, where the address of the second device is different from an address of the first device; the second connection parameter includes an address of the second device and a port number of the second device, where the address of the second device is different from an address of the first device; or the second connection parameter includes an address of the first device and a port number of the second device, where the port number of the second device is allocated for the first device.

The data transmission apparatus 300 according to an embodiment of the application may correspond to an execution body in a data transmission method according to an embodiment of the application. Modules in the data transmission apparatus 300 are respectively intended to provide corresponding procedures performed by the first device in the method shown in FIG. 2. For brevity, details are not described herein again.

Figure 4:
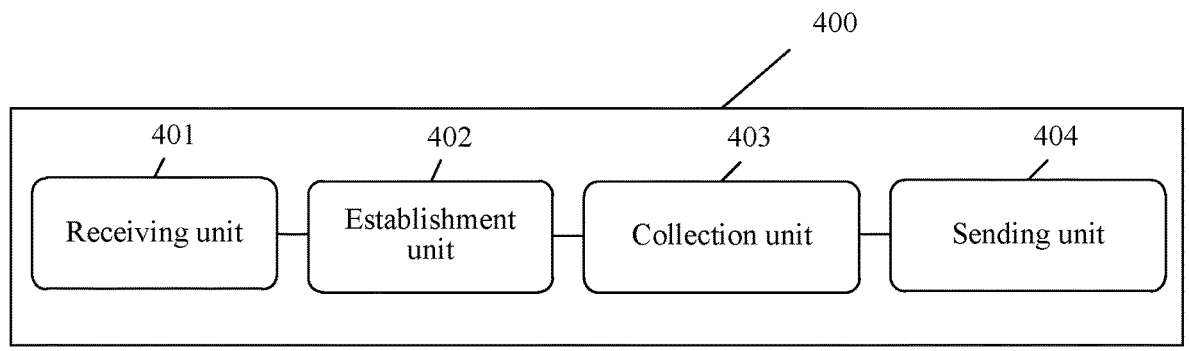
FIG. 4 is a schematic block diagram of another data transmission apparatus according to an embodiment of the invention.

FIG. 4 is a schematic block diagram of a data transmission apparatus 400 according to an embodiment of the application. The apparatus 400 is a second device in a distributed system, for example, any one of a device 102, a device 103, and a device 104. As shown in FIG. 4, the data transmission apparatus 400 includes:

a receiving unit 401, configured to receive a first connection parameter, a second connection parameter, and a target data feature that are sent from a first device, where the first connection parameter and the target data feature are sent from an analysis device to the first device, the second connection parameter is determined by the first device, and the first device belongs to the distributed system;

an establishment unit 402, configured to establish a connection to the analysis device by using the first connection parameter and the second connection parameter;

a collection unit 403, configured to collect to-be-analyzed data corresponding to the target data feature; and a sending unit 404, configured to send the to-be-analyzed data to the analysis device through the established connection.

In an embodiment of the application, after receiving a connection establishment request sent from the analysis device, the first device may determine, based on the target data feature sent from the analysis device, the apparatus 400 that collects the to-be-analyzed data, and the second connection parameter that may be used by the apparatus 400 to establish the connection, and then send the first connection parameter and the target data feature of the analysis device, and the second connection parameter of the apparatus 400 to the apparatus 400, so that the apparatus 400 may directly establish the connection to the analysis device, and transmit the collected to-be-analyzed data to the analysis device through the directly established connection. In this way, the apparatus 400 does not need to aggregate the collected to-be-analyzed data to the first device, but directly transmits the collected to-be-analyzed data to the analysis device. Therefore, even if a plurality of apparatuses 400 simultaneously collect the to-be-analyzed data, each of the plurality of apparatuses 400 may transmit respective collected to-be-analyzed data to the analysis device without causing a large amount of data to be aggregated to the first device, to prevent the first device from becoming a bottleneck during data transmission, and to further avoid a problem that the to-be-analyzed data cannot be sent to the analysis device in a timely manner, and an analysis result obtained by the analysis device is not timely and accurate.

It may be understood that the sending unit 404 is configured to:

encapsulate the to-be-analyzed data into a packet based on the first connection parameter and the second connection parameter; and send the encapsulated packet to the analysis device through the established connection.

It may be understood that the second connection parameter includes an address of the second device, where the address of the second device is different from an address of the first device;

the second connection parameter includes an address of the second device and a port number of the second device, where the address of the second device is different from an address of the first device; or the second connection parameter includes an address of the first device and a port number of the second device, where the port number of the second device is allocated for the first device.

The data transmission apparatus 400 according to an embodiment of the application may correspond to an execution body in a data transmission method according to an embodiment of the application. Modules in the data transmission apparatus 400 are respectively intended to provide corresponding procedures performed by the second device in the method shown in FIG. 2. For brevity, details are not described herein again.

Figure 5:
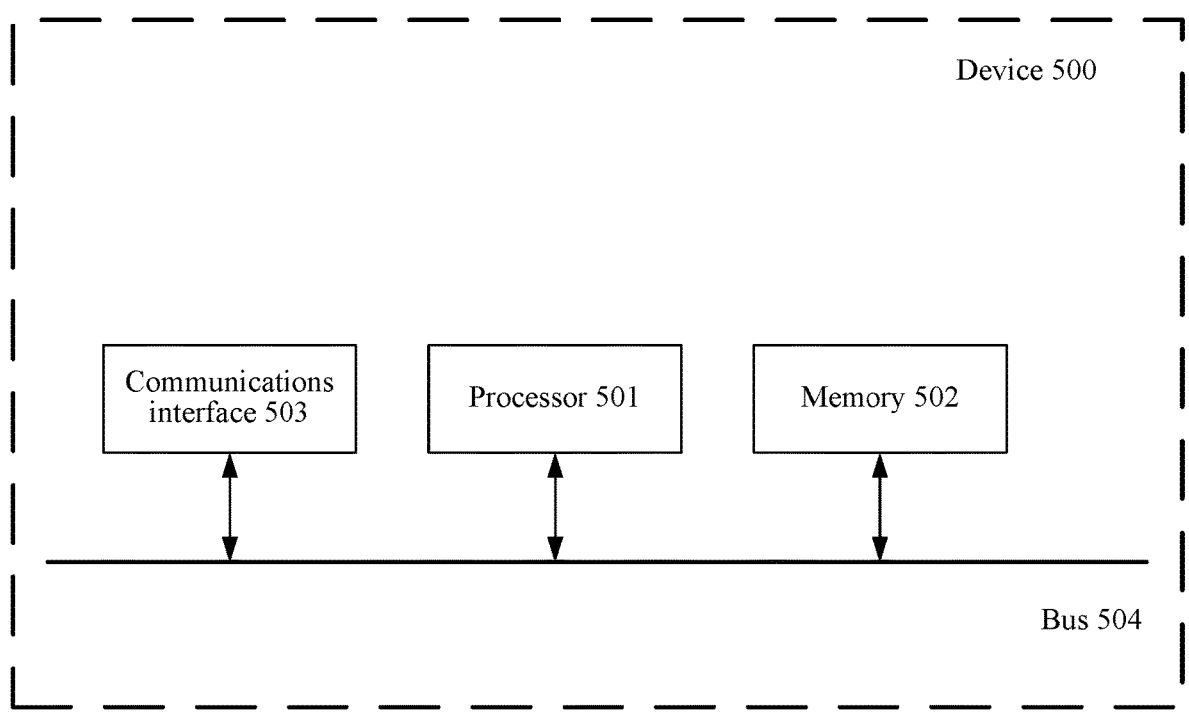
FIG. 5 is a schematic block diagram of a data transmission device according to an embodiment of the invention.

FIG. 5 is a schematic block diagram of a data transmission device 500 according to an embodiment of the application. As shown in FIG. 5, the device 500 includes a processor 501, a memory 502, and a communications interface 503, and the communications interface 503 is configured to communicate with an external device.

The processor 501 may include a central processing unit (CPU), a network processor (NP), or a combination thereof. The processor 501 may further include a hardware chip, for example, an application-specific integrated circuit (ASIC), a programmable logic device (PLD), or a combination thereof. The foregoing PLD may be a complex programmable logical device (CPLD), a field-programmable gate array (FPGA), a generic array logic (GAL), or a combination thereof. Each circuit in the processor 501 may be independent, or may be integrated in one or more chips.

The memory 502 may be an independent device, or may be integrated in the processor 501. The memory 502 may include a volatile memory such as a random access memory (RAM). The memory 502 may also include a non-volatile memory such as a flash memory, a hard disk drive (HDD), or a solid-state drive (SSD). The memory 502 may further include any combination of the foregoing types of memories.

The memory 502 may be configured to store a correspondence between a fault cause and fault coding; and optionally, the memory 502 is further configured to store a computer program instruction. The processor 501 executes the computer program instruction stored in the memory 502, to provide the method shown in FIG. 2.

The communications interface 503 may be a wireless interface or a wired interface. The wireless interface may be a cellular mobile network interface, a wireless local area network (WLAN) interface, or the like. The wired interface may be an Ethernet interface, for example, an optical interface or an electrical interface.

The device 500 may further include a bus 504, where the bus 504 is configured to connect the processor 501, the memory 502, and the communications interface 503, to enable the processor 501, the memory 502, and the communications interface 503 to communicate with each other through the bus 504.

In an embodiment, the memory 502 is configured to store program code, and the processor 501 is configured to invoke the program code to perform functions and operations of the first device in FIG. 2.

In another embodiment, the memory 502 is configured to store program code, and the processor 501 is configured to invoke the program code to perform functions and operations of the second device in FIG. 2.

An embodiment of the application further provides a data transmission system, including the data transmission apparatus 300 shown in FIG. 3 and the data transmission apparatus 400 shown in FIG. 4.

All or some of the foregoing embodiments may be implemented by using software, hardware, or a combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, a twisted pair, or an optical fiber) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like.

What is claimed is:

1. A data transmission method, comprising:
   receiving, by a first device, a connection establishment request and a target data feature that are sent from an analysis device, the connection establishment request comprising a first connection parameter that identifies the analysis device;
   determining, by the first device based on the target data feature, a second device that collects data corresponding to the target data feature, wherein the first device and the second device belong to a distributed system;
   determining, by the first device, a second connection parameter that identifies the second device;
   sending, by the first device to the analysis device, a mapping relationship between the second connection parameter and an interface corresponding to the second device, wherein the interface corresponding to the second device is used by the second device to collect the data; and
   sending, by the first device, the first connection parameter, the second connection parameter and the target data feature to the second device, so that the second device establishes a connection to the analysis device based on the first connection parameter and the second connection parameter, and transmits the data corresponding to the target data feature to the analysis device through the established connection.

2. The method according to claim 1, wherein determining, by the first device, the second connection parameter of the second device is performed when the first device determines, based on the target data feature, that the data identify at least one second device feature in the distributed system, or when a collection frequency of the data is greater than a frequency threshold.

3. The method according to claim 1, wherein the second connection parameter comprises an address of the second device, and the address of the second device is different from an address of the first device.

4. The method according to claim 1, wherein the second connection parameter comprises an address of the second device and a port number of the second device, and the address of the second device is different from an address of the first device.

5. The method according to claim 1, wherein the second connection parameter comprises an address of the first device and a port number of the second device, and the port number of the second device is allocated for the first device.

6. A data transmission method, comprising:
   receiving, by a second device, a first connection parameter, a second connection parameter and a target data feature that are sent from a first device, wherein the first connection parameter identifies an analysis device, and wherein the first connection parameter and the target data feature are sent from the analysis device to the first device, the second connection parameter is determined by the first device, and the first device and the second device belong to a distributed system, and wherein the first device sends, to the analysis device, a mapping relationship between the second connection parameter and an interface corresponding to the second device that is used by the second device to collect data;
   establishing, by the second device, a connection to the analysis device by using the first connection parameter and the second connection parameter;
   collecting, by the second device, the data corresponding to the target data feature; and
   sending, by the second device, the data to the analysis device through the established connection.

7. The method according to claim 6, wherein the sending, by the second device, the data to the analysis device through the established connection comprises:
   encapsulating, by the second device, the data into a packet based on the first connection parameter and the second connection parameter; and
   sending, by the second device, the encapsulated packet to the analysis device through the established connection.

8. The method according to claim 6, wherein the second connection parameter comprises an address of the second device, and the address of the second device is different from an address of the first device.

9. The method according to claim 6, wherein:
   the second connection parameter comprises an address of the second device and a port number of the second device, and the address of the second device is different from an address of the first device; or
   the second connection parameter comprises an address of the first device and a port number of the second device, and the port number of the second device is allocated for the first device.

10. A data transmission apparatus, wherein the apparatus is a first device in a distributed system, the apparatus comprising:
    a memory; and
    a processor coupled to the memory, wherein
    the processor is configured to:
    receive a connection establishment request and a target data feature that are sent from an analysis device, the connection establishment request comprising a first connection parameter that identifies the analysis device;

determine, based on the target data feature, a second device that collects data corresponding to the target data feature, wherein the second device belongs to the distributed system;

determine a second connection parameter that identifies the second device;

send, by the first device to the analysis device, a mapping relationship between the second connection parameter and an interface corresponding to the second device, wherein the interface corresponding to the second device is used by the second device to collect the data; and send the first connection parameter, the second connection parameter, and the target data feature to the second device, so that the second device establishes a connection to the analysis device based on the first connection parameter and the second connection parameter, and transmits the data corresponding to the target data feature to the analysis device through the established connection.

11. The apparatus according to claim 10, wherein the processor is configured to determine the second connection parameter of the second device, when the processor determines, based on the target data feature, that the data identify at least one second device feature in the distributed system, or when a collection frequency of the data is greater than a frequency threshold.

12. The apparatus according to claim 10, wherein the second connection parameter comprises an address of the second device, and the address of the second device is different from an address of the first device.

13. The apparatus according to claim 10, wherein the second connection parameter comprises an address of the second device and a port number of the second device, and the address of the second device is different from an address of the first device.

14. The apparatus according to claim 10, wherein the second connection parameter comprises an address of the first device and a port number of the second device, and the port number of the second device is allocated for the first device.

15. A data transmission apparatus, wherein the apparatus is a second device in a distributed system, the data transmission apparatus comprising:
a memory; and
a processor coupled to the memory, wherein the processor is configured to:
receive a first connection parameter, a second connection parameter, and a target data feature that are sent from a first device, wherein the first connection parameter identifies an analysis device, and wherein the first connection parameter and the target data feature are sent from the analysis device to the first device, the second connection parameter identifies the second device and is determined by the first device, and the first device belongs to the distributed system, and wherein the first device sends, to the analysis device, a mapping relationship between the second connection parameter and an interface corresponding to the second device that is used by the second device to collect data;

establish a connection to the analysis device by using the first connection parameter and the second connection parameter;

collect the data corresponding to the target data feature; and send the data to the analysis device through the established connection.

16. The apparatus according to claim 15, wherein the processor is further configured to:
encapsulate the data into a packet based on the first connection parameter and the second connection parameter; and
send the encapsulated packet to the analysis device through the established connection.

17. The apparatus according to claim 15, wherein the second connection parameter comprises an address of the second device, and the address of the second device is different from an address of the first device.

18. The apparatus according to claim 15, wherein:
the second connection parameter comprises an address of the second device and a port number of the second device, and the address of the second device is different from an address of the first device; or
the second connection parameter comprises an address of the first device and a port number of the second device, and the port number of the second device is allocated for the first device.

* * * * *